United States Patent
Ohira

(10) Patent No.: US 10,770,941 B2
(45) Date of Patent: Sep. 8, 2020

(54) ROTOR OF ROTATING ELECTRICAL MACHINE

(71) Applicant: HONDA MOTOR CO., LTD., Tokyo (JP)

(72) Inventor: Kengo Ohira, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/255,979

(22) Filed: Jan. 24, 2019

(65) Prior Publication Data
US 2019/0238017 A1     Aug. 1, 2019

(30) Foreign Application Priority Data

Jan. 30, 2018 (JP) .................................. 2018-014090

(51) Int. Cl.
  *H02K 1/32*  (2006.01)
  *H02K 1/27*  (2006.01)
  *H02K 9/19*  (2006.01)

(52) U.S. Cl.
  CPC ............... *H02K 1/32* (2013.01); *H02K 1/276* (2013.01); *H02K 1/2766* (2013.01); *H02K 9/19* (2013.01);
  (Continued)

(58) Field of Classification Search
  CPC ............... H02K 1/27; H02K 1/32; H02K 9/19
  (Continued)

(56) References Cited

U.S. PATENT DOCUMENTS

| 5,760,520 A * | 6/1998 | Hasebe | H02K 1/278 310/156.15 |
| 2011/0278967 A1 | 11/2011 | Utaka | |

(Continued)

FOREIGN PATENT DOCUMENTS

| JP | 2005-124356 A | 5/2005 |
| JP | 2008-312292 A | 12/2008 |

(Continued)

OTHER PUBLICATIONS

Oct. 23, 2019, Japanese Office Action issued for related JP Application No. 2018-014090.

(Continued)

*Primary Examiner* — Jose A Gonzalez Quinones
(74) *Attorney, Agent, or Firm* — Paratus Law Group, PLLC

(57) ABSTRACT

A rotor of a rotating electrical machine includes: a magnet; and a rotor yoke including at least a first core block and a second core block formed by stacking steel plates, each of the steel plates includes an opening portion serving as a coolant flow path, the opening portion positioned on an outermost diameter side includes an outer-diameter-side inner wall portion with a predetermined width in a circumferential direction and located on an imaginary circle centered on an axis of the rotor, the second core block is arranged adjacent to the first core block while the second core block is rotated by a predetermined angle with respect to the first core block, and the predetermined width is a length at which the outer-diameter-side inner wall portions of the opening portions of the first core block and the second core block overlap each other when seen from the axial direction.

3 Claims, 3 Drawing Sheets

(52) U.S. Cl.
CPC ..... *H02K 2201/06* (2013.01); *H02K 2213/03* (2013.01)

(58) Field of Classification Search
USPC .............................. 310/52, 58, 59, 60 R, 61
See application file for complete search history.

(56) References Cited

U.S. PATENT DOCUMENTS

2016/0211711 A1* 7/2016 Yazaki ................... H02K 1/276
2016/0261158 A1   9/2016 Horii et al.

FOREIGN PATENT DOCUMENTS

| JP | 2009-089470 A | 4/2009 |
| JP | 2011-223717 A | 11/2011 |
| JP | 2011-259691 A | 12/2011 |
| JP | 2015-053831 A | 3/2015 |
| JP | 6017067 B2 | 10/2016 |
| WO | WO 2017/006430 A1 | 1/2017 |

OTHER PUBLICATIONS

Jan. 7, 2020, Japanese Office Action issued for related JP Application No. 2018-014090.

* cited by examiner

ROTOR OF ROTATING ELECTRICAL MACHINE

CROSS-REFERENCE TO RELATED APPLICATIONS

The present application claims the benefit of priority of Japanese Patent Application No. 2018-014090, filed on Jan. 30, 2018, the content of which is incorporated herein by reference.

TECHNICAL FIELD

The present invention relates to a rotor of a rotating electrical machine installed in an electric vehicle or the like.

BACKGROUND ART

Generally, in a rotor of a rotating electrical machine, a rotor yoke is formed by stacking a plurality of steel plates formed in a substantially annular shape and a plurality of magnets forming magnet pole sections are embedded in an outer circumferential side of the rotor yoke. In recent years, to reduce heat generation of a magnet due to high output of a rotating electrical machine, a rotor yoke is provided with a cooling passage for cooling the rotor from inside.

An electric motor in which a cooling passage extending in an axial direction is provided in a rotor yoke in which a plurality of magnets are embedded and the rotor yoke is cooled by a coolant flowing through the cooling passage, and then the coolant is discharged from a hole provided in an end plate has been disclosed in JP-A-2011-223717.

A technique in which, in a rotor of a rotating electrical machine, to equalize distortion and magnetic characteristics of steel plates when a rotor yoke is manufactured, a core block constituted by stacking a plurality of steel plates is assembled by rotating the core block (hereinafter, also referred to as "being skewed") by a predetermined angle has been known.

However, in a rotor of an electric motor of the related art, when core blocks are skewed, there is a possibility that a coolant reservoir is caused between the core blocks and in a cooling passage formed in a rotor yoke and the coolant cannot be completely discharged and may remain in the cooling passage. The coolant staying in the cooling passage becomes a cause of imbalance of the rotor and there is a possibility that vibration may occur due to the imbalance when the rotor operates.

SUMMARY

The invention provides a rotor of a rotating electrical machine capable of preventing occurrence of imbalance due to a coolant staying in a cooling passage.

According to an aspect of the invention, there is provided a rotor of a rotating electrical machine including: a magnet; and a rotor yoke in which a magnet insertion hole for accommodating the magnet and a coolant flow path are formed, wherein: the rotor yoke includes at least a first core block and a second core block formed by stacking steel plates with the same shape; each of the steel plates includes an opening portion serving as the coolant flow path; the opening portion positioned on an outermost diameter side includes an outer-diameter-side inner wall portion with a predetermined width in a circumferential direction and located on an imaginary circle centered on an axis of the rotor when seen from an axial direction; the second core block is arranged adjacent to the first core block while the second core block is rotated by a predetermined angle with respect to the first core block; and the predetermined width is a length at which the outer-diameter-side inner wall portions of the opening portions of the first core block and the second core block overlap each other when seen from the axial direction.

Effects

According to the invention, since the outer-diameter-side inner wall portions of the coolant flow paths overlap on the imaginary circle even when the first core block and the second core block are stacked while being rotated by the predetermined angle, the coolant flow paths of the adjacent first core block and second core block communicate in the axial direction via an arcuate surface having no step or coolant reservoir, and thus the coolant is prevented from staying in the coolant flow path. Therefore, vibration due to imbalance of the coolant when the rotor operates, the imbalance of the coolant being caused by the coolant staying in the coolant flow path when the rotor is stopped, can be prevented.

DETAILED DESCRIPTION OF EMBODIMENT

Hereinafter, a rotor of a rotating electrical machine according to an embodiment of the invention will be described with reference to FIGS. 1 to 3.

Figure 1:
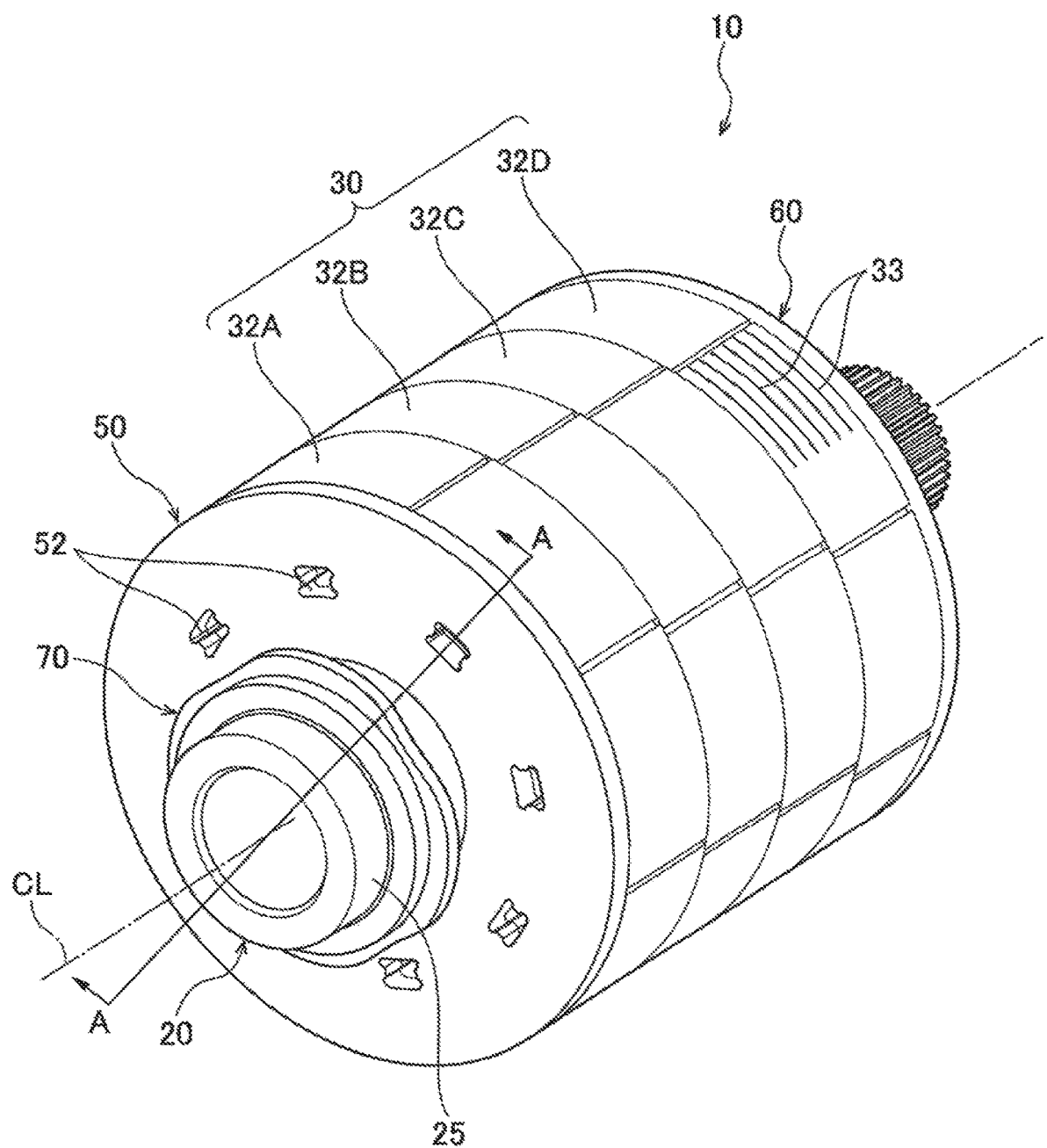
FIG. 1 is a perspective view of a rotor of a rotating electrical machine according to an embodiment of the invention.
Figure 2:
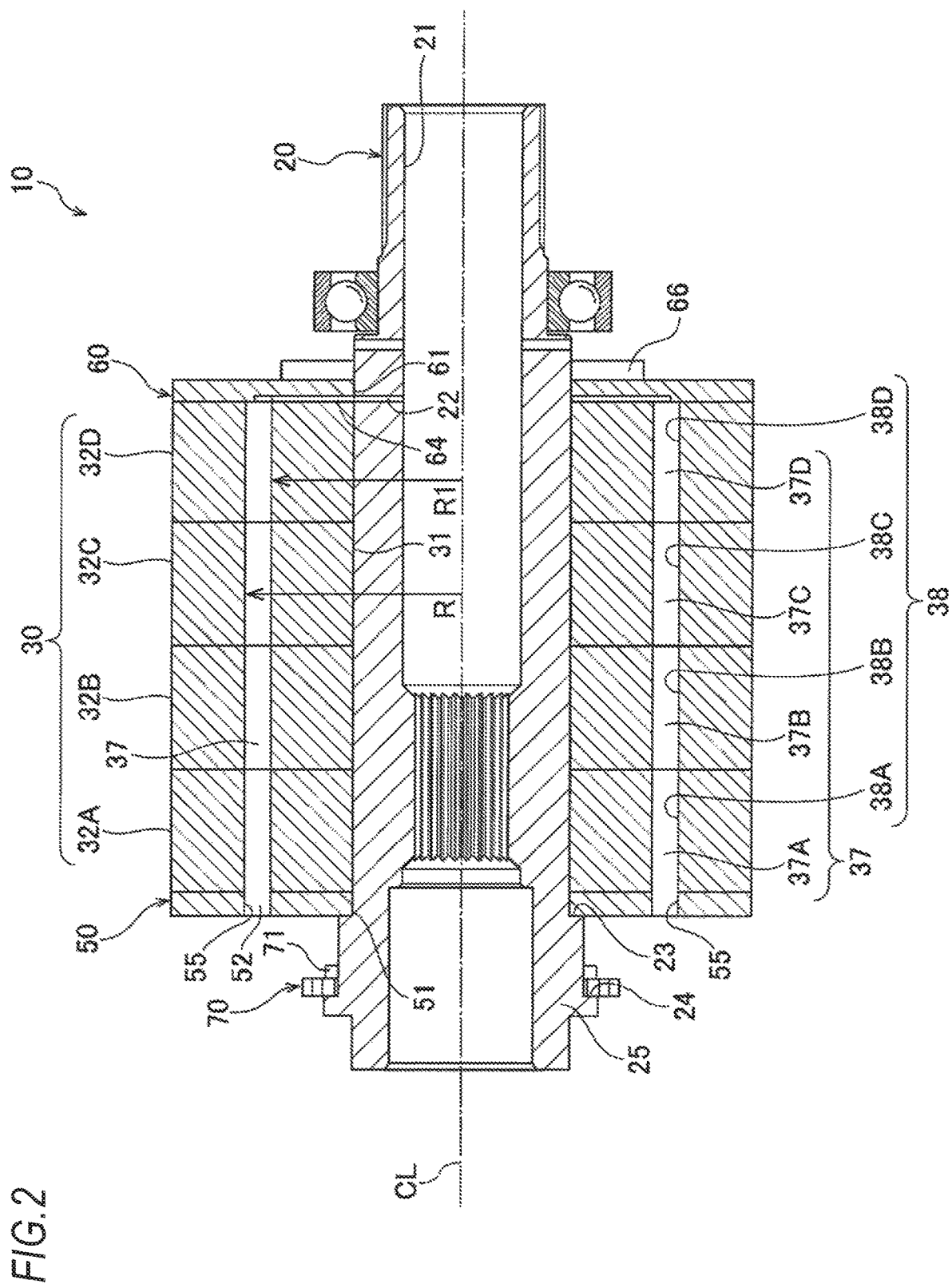
FIG. 2 is a cross-sectional view taken along the line A-A in FIG. 1 and the line B-B in FIG. 3.

As illustrated in FIGS. 1 and 2, a rotor 10 of a rotating electrical machine according to the embodiment includes a rotor shaft 20, a rotor yoke 30 fixed to the rotor shaft 20, a first end plate 50 disposed on one axial side of the rotor yoke 30, a second end plate 60 disposed on the other axial side of the rotor yoke 30, and a resolver 70 for detecting a rotation angle of the rotor 10.

In the rotor shaft 20, a cooling flow path 21 through which a coolant flows is formed inside the rotor shaft 20. The cooling flow path 21 extends in an axial direction inside the rotor shaft 20 and is configured so that the coolant can be supplied from the outside. As the coolant, for example, automatic transmission fluid (ATF) is used and a supply path is formed so that the ATF circulates between a transmission case and a motor housing.

In the rotor shaft 20, a coolant supply hole portion 22 for feeding the coolant from the cooling flow path 21 to a portion between the rotor yoke 30 and the second end plate 60 is formed. A large diameter portion 25 including first and second step portions 23 and 24 is formed at one end (left-side end portion in FIG. 2) of the rotor shaft 20.

The rotor yoke 30 has a cylindrical shape and a rotor insertion hole 31 passing through the rotor yoke 30 in the axial direction is formed in a central portion thereof. A frictional force is generated between an inner circumferential surface of the rotor insertion hole 31 and an outer circumferential surface of the rotor shaft 20 by press-fitting the rotor yoke 30 to the rotor shaft 20, and therefore the rotor yoke 30 is fixed to the rotor shaft 20.

A shaft insertion hole 51 is formed in a central portion of the first end plate 50 and the rotor shaft 20 is loosely fitted thereto. The first end plate 50 is positioned at an axial position by being interposed between one axial end surface of the rotor yoke 30 and the first step portion 23.

On a side further on an outer side in a radial direction than the shaft insertion hole 51, end plate hole portions 52 are formed at equal intervals in a circumferential direction. The end plate hole portion 52 is formed in a substantially rectangular cross-sectional shape as similar to that of a yoke hollow portion 37 described below and the same number of end plate hole portions 52 as that of the yoke hollow portions 37 are formed at the same radial positions and at the same circumferential intervals as those of the yoke hollow portions 37.

A shaft insertion hole 61 is formed in a central portion of the second end plate 60 and the rotor shaft 20 is loosely fitted thereto. The second end plate 60 abuts on the other axial end surface of the rotor yoke 30 and an axial position thereof is positioned by an end plate collar 66 press-fitted to the rotor shaft 20.

An annular groove 64 which communicates with the coolant supply hole portion 22 of the rotor shaft 20 and communicates with the yoke hollow portion 37 described below is formed on an inner surface of the second end plate 60 which is the surface on the rotor yoke 30 side.

The resolver 70 is used for detecting the rotation angle of the rotor 10. The resolver 70 is press-fitted to the large diameter portion 25 and fixed to the rotor shaft 20 by being interposed between a resolver collar 71 which is also press-fitted to the large diameter portion 25 and the second step portion 24.

Figure 3:
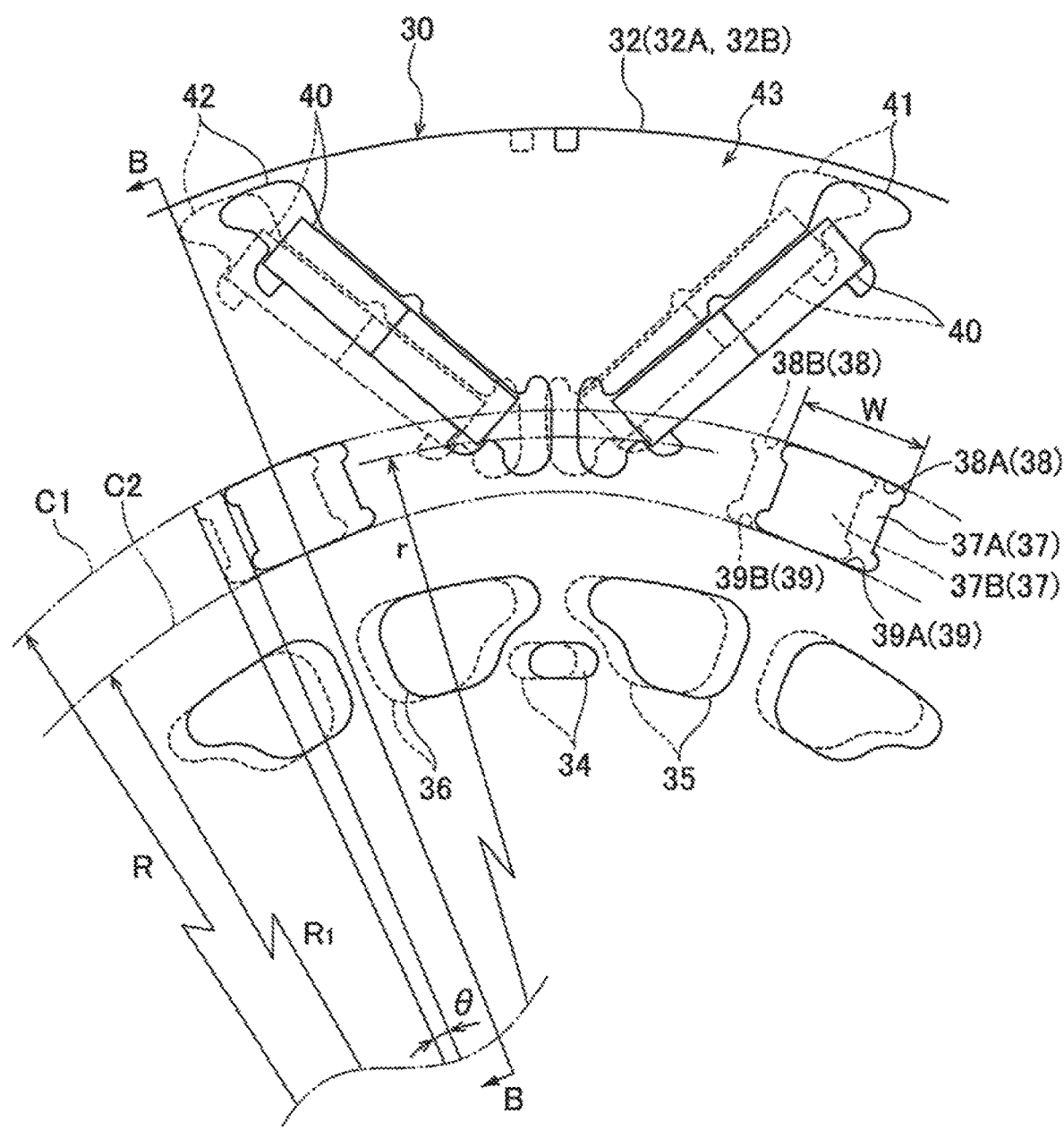
FIG. 3 is a front enlarged view illustrating a pair of core blocks (first core block and second core block) which is skewed after an end plate is removed.

As illustrated in FIG. 3, to reduce the weight of the rotor yoke 30, a plurality of hollow portions 34 to 37 passing through the rotor yoke 30 in the axial direction are formed in the rotor yoke 30 at predetermined intervals in the circumferential direction. The hollow portions 35 and 36 have a substantially trapezoidal cross-sectional shape and are symmetrically formed while the hollow portion 34 having a substantially oval cross-sectional shape is interposed therebetween. The hollow portion 37 (hereinafter, this hollow portion is referred to as the yoke hollow portion 37) is positioned on a circumferential side further on the outer side than the hollow portions 34 to 36 and has a substantially rectangular cross-sectional shape.

The yoke hollow portion 37 is a coolant flow path positioned on an outermost diameter side of a core block 32. The hollow portions 34 to 36 may be a coolant flow path or may not be a coolant flow path. An outer-diameter-side inner wall portion 38 of the yoke hollow portion 37 is provided on an imaginary circle C1 having a radius R centered on an axis CL of the rotor 10.

In the rotor yoke 30, magnet insertion holes 41 and 42 for embedding magnets 40 are formed in a substantially V shape on a further outer circumferential side of the yoke hollow portion 37 and a plurality of the magnet insertion holes 41 and 42 are formed at predetermined intervals in the circumferential direction. The magnet 40 is, for example, a permanent magnet such as a neodymium magnet. In the embodiment, one magnet pole section 43 is constituted of two magnets 40 arranged in the magnet insertion holes 41 and 42. The yoke hollow portion 37 is arranged between adjacent magnet pole sections 43 in the circumferential direction.

The radius R of the imaginary circle C1 passing through the outer-diameter-side inner wall portion 38 of the yoke hollow portion 37 is set to be longer than a distance r from the axis CL to an innermost diameter portion of the magnet 40.

In the rotor 10 configured as described above, the coolant pressure-fed from a cooling pump (not illustrated) and supplied to the cooling flow path 21 is supplied to the coolant supply hole portion 22, the annular groove 64, and the yoke hollow portion 37 and flows in the yoke hollow portion 37 from the second end plate 60 side to the first end plate 50 side, and then the coolant is discharged from the end plate hole portion 52 of the first end plate 50. Since the radius R of the imaginary circle C1 passing through the outer-diameter-side inner wall portion 38 of the yoke hollow portion 37 is set to be longer than the distance r from the axis CL to the innermost diameter portion of the magnet 40, the magnet 40 of which the temperature rises easily can be effectively cooled from a closer position.

Here, the rotor yoke 30 is provided with a plurality of core blocks 32 (four core blocks 32A, 32B, 32C, and 32D in an example illustrated in FIG. 2) and formed by stacking (rotationally stacking) the core blocks 32 while the core blocks 32 are rotated by a predetermined skew angle θ in the circumferential direction. In the following description, the four core blocks 32A to 32D may be referred to as a first core block 32A, a second core block 32B, a third core block 32C, and a fourth core block 32D in order from the first end plate 50 side.

Specifically, the first core block 32A and the second core block 32B, the second core block 32B and the third core block 32C, and the third core block 32C and the fourth core block 32D which are adjacently arranged in the axial direction are stacked with phases different by the predetermined skew angle θ in the circumferential direction. Therefore, it is possible to equalize distortion and magnetic characteristics of the core blocks to be stacked.

Each core block 32 is formed by stacking electromagnetic steel plates 33 having substantially the same shape in a left-right direction in FIG. 2 and connecting them with crimping, bonding, or welding. The number of stacked electromagnetic steel plates 33 may be different in each of the core blocks 32A to 32D. The core blocks 32A to 32D include those having the same cross-sectional shape and different only in the thickness-direction size.

The positional relationship between the first core block 32A and the second core block 32B are the same as those between the second core block 32B and the third core block 32C and between the third core block 32C and the fourth core block 32D. Thus, hereinafter, a relationship between the first core block 32A and the second core block 32B will be mainly described and the detailed descriptions of relationships between the second core block 32B and the third core block 32C and between the third core block 32C and the fourth core block 32D are simplified or omitted. In FIG. 3, only the first core block 32A and the second core block 32B are illustrated for easy understanding.

As illustrated in FIG. 3, the yoke hollow portion 37 is the coolant flow path positioned on the outermost diameter side of the core block 32 as described above and the outer-diameter-side inner wall portion 38 thereof is provided on the imaginary circle C1 having the radius R centered on the axis CL of the rotor 10. As a result, outer-diameter-side inner wall portions 38A, 38B, 38C, and 38D of yoke hollow portions 37A, 37B, 37C, and 37D of the core blocks 32A, 32B, 32C, and 32D are located on the imaginary circles C1 having the same radius R.

A circumferential width W of the outer-diameter-side inner wall portion 38 is set such that the outer-diameter-side inner wall portions 38 of the adjacent core blocks 32 overlap in the circumferential direction when the core blocks 32 are stacked with phases different by the predetermined skew angle θ. That is, the circumferential width W of the outer-diameter-side inner wall portion 38 is set to satisfy the relation of W>2πR×(θ/360).

Specifically, when the rotor yoke 30 is assembled, the outer-diameter-side inner wall portion 38A of the first core block 32A and the outer-diameter-side inner wall portion 38B of the second core block 32B overlap in the circumferential direction as illustrated in FIG. 3. Therefore, the yoke hollow portion 37A of the first core block 32A and the yoke hollow portion 37B of the second core block 32B communicate with each other in the axial direction and the outer-diameter-side inner wall portion 38A of the first core block 32A and the outer-diameter-side inner wall portion 38B of the second core block 32B form an arcuate surface with no step or coolant reservoir.

Similarly, the outer-diameter-side inner wall portion 38B of the second core block 32B and the outer-diameter-side inner wall portion 38C of the third core block 32C and the outer-diameter-side inner wall portion 38C of the third core block 32C and the outer-diameter-side inner wall portion 38D of the fourth core block 32D also overlap in the circumferential direction. Therefore, the yoke hollow portion 37B of the second core block 32B and the yoke hollow portion 37C of the third core block 32C and the yoke hollow portion 37C of the third core block 32C and the yoke hollow portion 37D of the fourth core block 32D also form an arcuate surface with no step or coolant reservoir.

Therefore, since the yoke hollow portions 37 (coolant flow paths) of the adjacent core blocks 32 communicate with each other in the axial direction via an arcuate surface with no step or coolant reservoir, the coolant is prevented from staying in the yoke hollow portion 37. Therefore, occurrence of imbalance due to the coolant remaining in the yoke hollow portion 37 is prevented, and thus an obstacle such as vibration when the rotor operates is prevented.

When the rotor 10 rotates, the coolant supplied to the yoke hollow portion 37 is discharged from the end plate hole portion 52 by centrifugal force as described above. On the other hand, when the rotor 10 is stopped, the coolant flows into the yoke hollow portion 37 located on a lower side by gravity. In this case, when there is a coolant reservoir, the coolant remains in the coolant reservoir and this causes imbalance of the rotor 10. However, since the outer-diameter-side inner wall portion 38 of the yoke hollow portion 37 is located on the imaginary circle C1 having the radius R and the yoke hollow portions 37 (coolant flow paths) of the adjacent core blocks 32 communicate with each other in the axial direction via an arcuate surface with no step or coolant reservoir, the coolant does not remain in the yoke hollow portion 37 and is discharged from the end plate hole portion 52 of the first end plate 50 by gravity.

It is preferable that inner-diameter-side inner wall portions 39 (inner-diameter-side inner wall portions 39A and 39B in FIG. 3) of the respective yoke hollow portions 37 be formed on imaginary circles C2 with same radius RI centered on the axis CL of the rotor 10 to form no coolant reservoir, it is preferable that a circumferential width of the inner-diameter-side inner wall portion 39 be also set such that the inner-diameter-side inner wall portions 39 of the adjacent core blocks 32 overlap in the circumferential direction when the core blocks 32 are stacked with phases different by the predetermined skew angle θ. As a result, it is possible to improve the fluidity of the coolant in the inner-diameter-side inner wall portion 39 during low-speed rotation of the rotor 10 or the like. The circumferential width of the inner-diameter-side inner wall portion 39 may be equal to or different from the circumferential width W of the outer-diameter-side inner wall portion 38.

The embodiment described above can be appropriately modified, improved or the like. For example, in the embodiment described above, the end plate hole portion 52 is described as a hole portion having the same shape as the yoke hollow portion 37. However, the end plate hole portion 52 may have a size larger than the yoke hollow portion 37, the size large enough to communicate with the yoke hollow portion 37 when the rotor 10 is assembled and expose the yoke hollow portion 37 from the end plate hole portion 52.

The end plate hole portion may be provided in the second end plate 60 or may be provided in both the first end plate 50 and the second end plate 60.

The circumferential width W of the outer-diameter-side inner wall portion 38 may be set such that the outer-diameter-side inner wall portions 38 of the yoke hollow portions 37 of every core block 32, not only adjacent core blocks 32, overlap each other. As a result, the coolant is further reliably prevented from staying in the yoke hollow portion 37.

Skew directions may be set to the same direction or may be set to the reverse direction. The skew angles θ may be the same or different.

At least the following matters are described in this specification. Although the corresponding constituent elements or the likes in the embodiment described above are described in parentheses, it is not limited thereto.

(1) A rotor (rotor 10 of a rotating electrical machine) of a rotating electrical machine which includes a magnet (magnet 40) and a rotor yoke (rotor yoke 30) in which a magnet insertion hole (magnet insertion holes 41 and 42) for accommodating the magnet and a coolant flow path (yoke hollow portion 37) are formed, in which the rotor yoke includes at least a first core block (first core block 32A) and a second core block (second core block 32B) formed by stacking steel plates (electromagnetic steel plates 33) with the same shape, each of the steel plates includes an opening portion (yoke hollow portion 37) serving as the coolant flow path, the opening portion positioned on an outermost diameter side includes an outer-diameter-side inner wall portion (outer-diameter-side inner wall portion 38) having a predetermined width (circumferential width W) in a circumferential direction and located on an imaginary circle (imaginary circle C1) centered on an axis (axis CL) of the rotor when seen from an axial direction, the second core block is arranged adjacent to the first core block while the second core block is rotated by a predetermined angle (skew angle θ) with respect to the first core block, and the predetermined width is a length at which the outer-diameter-side inner wall portions of the opening portions of the first core block and the second core block overlap each other when seen from the axial direction.

According to (1), since the outer-diameter-side inner wall portions of the opening portions of the coolant flow paths overlap on the imaginary circle even when the first core block and the second core block are stacked in a state where the first core block and the second core block are rotated by the predetermined angle, the coolant flow paths of the adjacent first core block and second core block communicate in the axial direction via an arcuate surface having no step or coolant reservoir, and thus the coolant is prevented from staying in the coolant flow path. Therefore, occurrence of vibration due to imbalance of the coolant at the time of start, the imbalance of the coolant being caused by the coolant staying in the coolant flow path when the rotor is stopped, can be prevented.

(2) The rotor of a rotating electrical machine according to (1), in which the rotor yoke includes the plurality of core blocks (core blocks 32A, 32B, 32C, and 32D) formed by stacking the steel plates with the same shape and are arranged adjacent to each other while the core blocks are rotated by a predetermined angle, and the predetermined width is a length at which the outer-diameter-side inner wall portions of the opening portions of the plurality of core blocks overlap each other when seen from the axial direction.

According to (2), since the outer-diameter-side inner wall portions of the opening portions of the coolant flow paths overlap on the imaginary circle even when the plurality of core blocks are stacked in a state where the core blocks are rotated by the predetermined angle, the coolant flow paths of the plurality of core blocks communicate in the axial direction via the arcuate surface having no step or coolant reservoir. As a result, it is possible to further reliably prevent the coolant from staying in the coolant flow path.

(3) The rotor of a rotating electrical machine according to (1) or (2), in which a radius (radius R) of the imaginary circle is longer than a distance (distance r) from the axis to an innermost diameter portion of the magnet.

According to (3), the coolant flow path can be disposed close to the magnet, and thus cooling efficiency of the rotor is improved by performing cooling at a position close to the magnet.

(4) The rotor of a rotating electrical machine according to any one of (1) to (3), in which the rotor includes a magnet pole section (magnet pole section 32) formed by at least one magnet, and the coolant flow path is disposed between the magnet pole sections adjacent in the circumferential direction.

According to (4), hindrance of a magnetic path by the coolant flow path is suppressed, and thus deterioration of torque characteristics due to providing the coolant flow path can be prevented.

The invention claimed is:

1. A rotor of a rotating electrical machine comprising:
a magnet; and
a rotor yoke in which a magnet insertion hole for accommodating the magnet and a coolant flow path are formed, wherein:
the rotor yoke includes at least a first core block and a second core block formed by stacking steel plates with the same shape;
each of the steel plates includes an opening portion serving as the coolant flow path;
the opening portion positioned on an outermost diameter side includes an outer-diameter-side inner wall portion with a predetermined width in a circumferential direction and located on a first imaginary circle centered on an axis of the rotor when seen from an axial direction and an inner-diameter-side inner wall portion located on a second imaginary circle centered on the axis of the rotor;
a radius of the first imaginary circle is longer than a distance from the axis to an innermost diameter portion of the magnet, and a radius of the second imaginary circle is shorter than the distance from the axis to the innermost diameter portion of the magnet;
the second core block is arranged adjacent to the first core block while the second core block is rotated by a predetermined angle with respect to the first core block; and
the predetermined width is a length at which the outer-diameter-side inner wall portions of the opening portions of the first core block and the second core block overlap each other when seen from the axial direction.

2. The rotor of a rotating electrical machine according to claim 1, wherein:
the rotor yoke includes the plurality of core blocks formed by stacking the steel plates with the same shape and are arranged adjacent to each other while the core blocks are rotated by a predetermined angle; and
the predetermined width is a length at which the outer-diameter-side inner wall portions of the opening portions of the plurality of core blocks overlap each other when seen from the axial direction.

3. The rotor of a rotating electrical machine according to claim 1, wherein:
the rotor includes a magnet pole section formed by at least one magnet; and
the coolant flow path is disposed between the magnet pole sections adjacent in the circumferential direction.

* * * * *